Patented Jan. 14, 1936

2,027,420

UNITED STATES PATENT OFFICE 2,027,420

PROCESS FOR REMOVING WATER FROM VAPOROUS MIXTURES CONTAINING ALIPHATIC ANHYDRIDES

Henry Dreyfus, London, England

No Drawing. Application July 1, 1932, Serial No. 620,544. In Great Britain July 27, 1931

19 Claims. (Cl. 260—123)

This invention has for its object the separation of aliphatic anhydrides from vaporous reaction products or other vaporous mixtures comprising aliphatic anhydride vapor and water vapor. The invention has particular reference to the separation of acetic or other aliphatic anhydrides from the vaporous reaction products resulting from the thermal decomposition of acetic or other aliphatic acids.

According to the invention the water present is removed wholly or partly from the reaction vapors, or other vaporous mixtures comprising both aliphatic anhydrides and water, by causing it to react chemically with methane, or other gaseous or vaporous hydrocarbon, (especially paraffin hydrocarbons), carbon monoxide, or other substances, gaseous or otherwise, capable of chemical reaction with water. In such chemical reaction the substances employed are oxidized by the oxygen of the water, thereby removing or destroying the water entering into reaction.

In performing the invention the reaction between the water and the substance or substances employed may be effected in any convenient manner and under any appropriate conditions. The reaction may be, and preferably is, conducted in presence of catalysts capable of promoting reaction between the water and the methane or other hydrocarbon, carbon monoxide or other substance employed. The following may be mentioned as examples of catalysts particularly suitable for the purposes of the invention:— nickel, cobalt, nickel or cobalt activated with alumina or magnesia, copper, silica, alumina, magnesia or mixtures of any of such catalysts. Whilst these catalysts effectively promote reaction between steam and a very large number of gases or vapors applicable for the purposes of the invention, the said catalysts are especially useful in cases where methane or other gaseous paraffin hydrocarbons or ethylene or other gaseous unsaturated hydrocarbons or carbon monoxide are employed.

Any suitable temperatures may be employed for effecting the reaction with steam. In cases where methane or other gaseous hydrocarbons, carbon monoxide or other gaseous substances are to be employed in presence of catalysts temperatures of upwards of about 400° C. and especially between about 600° and 800° C. are generally very suitable for the purposes of the invention. In the absence of catalysts somewhat higher temperatures, it may be even as high as 1000° C., are usually necessary. Preferably the use of high temperatures is avoided by using catalysts which enable the reaction to proceed at lower temperatures and thereby avoiding decomposition of the anhydride as far as possible. Very useful results are obtained in the case of methane or other gaseous hydrocarbons, carbon monoxide and a large number of other substances at temperatures as low as 400° C. with nickel or cobalt, (and especially nickel) alone or promoted by alumina or magnesia (for instance with about ½ to 5% of alumina or magnesia) whilst especially useful results are obtained with such substances and catalysts at temperatures between about 600° and 800° C. Silica, alumina, and copper may similarly be employed, temperatures of about 600° to 850° C. being very useful with such catalysts, especially when hydrocarbons are employed; when carbon monoxide is employed very useful results are obtained with copper catalysts at temperatures as low as about 400° to 500° C.

In cases where solid substances such as carbon (charcoal, coke or even coal or the like) are employed temperatures as low as about 500°–600° C. may usefully be employed. Temperatures of between about 700° and 900° C. are however especially suitable.

In performing the reaction with steam the use of substances liable to cause destruction of the anhydride into acetone or gaseous products should be avoided. Thus, for instance, iron, manganese, earth alkalies or compounds thereof should not be employed as catalysts. Such metals and compounds may, however, be present in admixture with other catalysts and certain of such compounds, particularly magnesia, have a promoting effect upon catalysts such as nickel or cobalt. Preferably, however, the presence of such substances as iron, manganese and compounds thereof is avoided.

The reaction between the steam and the substance employed can of course be effected in any convenient way. For instance, the mixture of the vaporous mixture to be separated and the methane or other gas or vapor employed may be passed in a stream through tubes or the like of copper, rustless steels (e. g. "Staybrite") or other suitable material heated to the desired temperature, the tubes or the like being preferably provided with suitable catalysts for the reaction. Or for instance the said mixture may be passed through molten baths, e. g. molten metals, salts or other appropriate substances heated to the desired temperatures, which baths preferably contain suitable catalysts for the reaction. In cases where solid substances such as carbon are employed for the reaction the vapors to be separated may similarly be passed, alone or in conjunction with methane or other gaseous substances capable of reacting with the water, through heated tubes or molten baths containing the carbon or other solid substance employed for the reaction with steam.

In performing the reaction with the steam in order to conserve the highest yields of anhydride the speed of passage of the vapors through the tubes, baths or other heating means should be so regulated that no substantial decomposition of the anhydride to gaseous products takes place, which decomposition is liable to take place at low speeds particularly at high temperatures. The higher the temperature the higher should be the speed of passage, as prolonged action at high temperatures may cause decomposition of the anhydride to gaseous products.

As above indicated, the invention has particular reference to the separation of acetic or other aliphatic anhydrides from the vaporous reaction products resulting from the thermal decomposition of acetic or other aliphatic acids. In effecting the separation from such vapors the said vapors are themselves preferably subjected to the separation treatment of the invention.

If desired, however, the thermal decomposition and separation may be effected simultaneously. In such cases, for instance, the methane or other gas or vapor employed for the reaction with the steam may be mixed with the aliphatic acid vapor and the resulting mixture subjected to the thermal decomposition, preferably in presence of catalysts capable of promoting the reaction with steam whether or not catalysts for promoting the thermal decomposition are employed. Or, for instance, in cases where solid substances such as carbon are employed the aliphatic acid vapors alone or in admixture with methane or other gases or vapors capable of reacting with the steam may be subjected to the thermal decomposition in the presence of the carbon or other solid substance of the character referred to in presence or absence of catalysts.

Preferably as above indicated the reaction vapors are subjected to the separation treatment subsequent to the thermal decomposition. In such cases the vapors resulting from the thermal decomposition are preferably subjected as quickly as possible after their leaving the zone of thermal decomposition to the separation of the invention. The thermal decomposition can of course be effected in any convenient or suitable way, as for instance by the methods described in U. S. Patents Nos. 1,735,957, 1,817,614, 1,915,573 and 1,931,687 and British Patent No. 303,772, or for instance by means of the molten or liquid baths in the manner described in British Patent No. 387,692. The separation of the anhydride from the reaction vapors by the method of the invention can of course be effected at temperatures and with speeds of passage similar to or dissimilar to those employed for the thermal decomposition.

The following example serves to illustrate a convenient form of execution of the invention, it being understood that it is given solely by way of illustration.

Example

A mixture of acetic acid vapor and methane containing about 1 to 2 volumes of methane for each volume of acetic acid vapor is passed over or otherwise in contact with calcium tungstate or sodium metaphosphate heated to a temperature between about 600° and 650° C. The resulting reaction vapors are conducted over finely divided nickel heated to a temperature between about 700° and 750° C. and thereafter subjected to condensation.

What I claim and desire to secure by Letters Patent is:—

1. Process for removing water from vaporous mixtures containing water and lower aliphatic anhydrides which comprises reacting under the action of heat said water in the vapor phase with a gaseous hydrocarbon.

2. Process for removing water from vaporous mixtures containing water and lower aliphatic anhydrides which comprises reacting under the action of heat said water in the vapor phase with a normally gaseous lower paraffin hydrocarbon.

3. Process for removing water from vaporous mixtures containing water and lower aliphatic anhydrides which comprises reacting under the action of heat said water in the vapor phase with methane.

4. Process for removing water from vaporous mixtures containing water and lower aliphatic anhydrides which comprises reacting under the action of heat said water in the vapor phase with ethylene.

5. Process for removing water from vaporous mixtures containing water and lower aliphatic anhydrides which comprises reacting said water in the vapor phase, at temperatures of between about 600 and 850° C. with a gaseous hydrocarbon.

6. Process for removing water from vaporous mixtures containing water and lower aliphatic anhydrides which comprises reacting under the action of heat said water in the vapor phase with a gaseous hydrocarbon in the presence of a metal selected from the group consisting of nickel, cobalt and copper.

7. Process for removing water from vaporous mixtures containing water and lower aliphatic anhydrides which comprises reacting under the action of heat said water in the vapor phase with a gaseous hydrocarbon in the presence of a metal selected from the group consisting of nickel and cobalt promoted by the addition of an oxide selected from the group consisting of alumina and magnesia.

8. Process for removing water from vaporous mixtures containing water and lower aliphatic anhydrides which comprises reacting said water in the vapor phase at temperatures of between about 600 and 850° C. with methane in the presence of a metal selected from the group consisting of nickel cobalt and copper.

9. In the manufacture of lower aliphatic anhydrides by thermal decomposition of the corresponding aliphatic acid vapor, the step of removing water from the vaporous thermal decomposition product by reacting under the reaction of heat said water in the vapor phase with a gaseous hydrocarbon.

10. Process according to claim 9, wherein the gaseous hydrocarbon is present during the thermal decomposition.

11. Process for removing water from vaporous mixtures containing water and acetic anhydride which comprises reacting under the reaction of heat the water in the vapor phase with a gaseous hydrocarbon.

12. Process for removing water from vaporous mixtures containing water and acetic anhydride which comprises reacting under the reaction of heat the water in the vapor phase with a normally gaseous lower paraffin hydrocarbon.

13. Process for removing water from vaporous mixtures containing water and acetic anhydride which comprises reacting under the reaction of heat the water in the vapor phase with methane.

14. Process for removing water from vaporous mixtures containing water and acetic anhydride which comprises reacting under the reaction of heat the water in the vapor phase with ethylene.

15. Process for removing water from vaporous mixtures containing water and acetic anhydride which comprises reacting under the reaction of heat the water in the vapor phase with a gaseous hydrocarbon in the presence of a metal selected from the group consisting of nickel, cobalt and copper.

16. Process for removing water from vaporous mixtures containing water and acetic anhydride which comprises reacting under the reaction of heat said water in the vapor phase with a gaseous hydrocarbon in the presence of a metal selected from the group consisting of nickel, cobalt and copper promoted by the addition of an oxide selected from the group consisting of alumina and magnesia.

17. Process for removing water from the vaporous mixtures containing water and acetic anhydride which comprises reacting the water at temperatures of between about 600 and 850° C. with methane in the presence of a metal selected from the group consisting of nickel, cobalt and copper.

18. In the manufacture of acetic anhydride by thermal decomposition of acetic acid vapor, the step of removing water from the vaporous thermal decomposition products by reacting under the action of heat said water in the vapor phase with a gaseous hydrocarbon.

19. In the manufacture of acetic anhydride by thermal decomposition of acetic acid vapor, the step of removing water from the vaporous thermal decomposition product by reacting said water in the vapor phase at temperatures of about 600–850° C. with methane in the presence of a metal selected from the group consisting of nickel, cobalt and copper.

HENRY DREYFUS.